US008227070B2

(12) United States Patent
Nagashima et al.

(10) Patent No.: US 8,227,070 B2
(45) Date of Patent: Jul. 24, 2012

(54) DECORATIVE MEMBER

(75) Inventors: Takashi Nagashima, Kyoto (JP); Suguru Nakao, Hyogo (JP); Takehiko Yamashita, Hyogo (JP); Shuji Yamashita, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/056,080

(22) PCT Filed: Dec. 25, 2009

(86) PCT No.: PCT/JP2009/007287
§ 371 (c)(1), (2), (4) Date: Jan. 26, 2011

(87) PCT Pub. No.: WO2011/077497
PCT Pub. Date: Jun. 30, 2011

(65) Prior Publication Data
US 2011/0281074 A1 Nov. 17, 2011

(51) Int. Cl.
*B32B 3/00* (2006.01)
*B32B 15/00* (2006.01)
*B32B 5/16* (2006.01)
*B32B 7/00* (2006.01)
*B32B 7/14* (2006.01)

(52) U.S. Cl. ........ 428/164; 428/161; 428/203; 428/204; 428/206; 428/207; 428/209; 428/913.3

(58) Field of Classification Search .................. 428/156, 428/161, 164, 172, 174, 187, 203, 204, 209, 428/907.7, 913.3, 206, 207
See application file for complete search history.

(56) References Cited

U.S. PATENT DOCUMENTS 6,150,007 A * 11/2000 Oshima et al. ................ 428/161

FOREIGN PATENT DOCUMENTS

| | | |
|---|---|---|
| JP | 57-100068 | 6/1982 |
| JP | 58-007494 | 2/1983 |
| JP | 1-242219 | 9/1989 |
| JP | 2-102010 | 4/1990 |
| JP | 4-47607 | 8/1992 |
| JP | 5-000645 | 1/1993 |
| JP | 6-99698 | 4/1994 |
| JP | 7-195462 | 8/1995 |
| JP | 2000-153566 | 6/2000 |
| JP | 2001-225349 | 8/2001 |
| JP | 2004-237614 | 8/2004 |
| JP | 2004-301688 | 10/2004 |
| JP | 2005-193634 | 7/2005 |
| JP | 2008-100367 | 5/2008 |
| JP | 2008-105435 | 5/2008 |

(Continued)

*Primary Examiner* — Catherine A Simone
(74) *Attorney, Agent, or Firm* — Hamre, Schumann, Mueller & Larson, P.C.

(57) ABSTRACT

A decorative member (1A) includes: a resin layer (2) having a front surface (2*b*) and a back surface (2*a*); and a reflective layer (3) formed on the back surface (2*a*) of the resin layer (2). The back surface (2*a*) of the resin layer (2) includes a receding surface (21) formed therein. The receding surface recedes gradually toward the front surface (2*b*) to change a thickness of the resin layer (2). A pigmented layer (4) configured so that lightness/depth of color thereof changes in accordance with the change in the thickness of the resin layer (2) is provided between the back surface (2*a*) of the resin layer (2) and the reflective layer (3).

7 Claims, 8 Drawing Sheets

FOREIGN PATENT DOCUMENTS

| | | |
|---|---|---|
| JP | 2008-213331 | 9/2008 |
| JP | 2008-284713 | 11/2008 |
| JP | 2009-269181 | 11/2009 |
| JP | 2009-269222 | 11/2009 |
| JP | 2011-005687 | 1/2011 |

* cited by examiner

DECORATIVE MEMBER

TECHNICAL FIELD

The technique disclosed herein relates to a decorative member that exhibits a pattern having a raised three-dimensional appearance.

BACKGROUND ART

Conventionally, as a decorative member for realizing a design with a three-dimensional visual effect, Patent Literature 1 has disclosed a decorative member 100 as shown in FIG. 8. In the decorative member 100, a transparent or translucent resin plate 200 has a back surface serrated with steep slopes 210 with a large inclination angle and gentle slopes 220 with a small inclination angle repeated alternately, and the back surface is covered with a colored layer 300.

The colored layer 300 has light reflecting capability. At portions of the colored layer 300 facing the gentle slopes 220, light that has entered the resin plate 200 through its front surface is reflected by the colored layer 300 so as to return to a front side. However, at portions of the colored layer 300 facing the steep slopes 210, the light is reflected by the colored layer 300 so as to veer in a lateral direction. This allows the colored layer 300 to look dark at portions corresponding to the steep slopes 210, forming a three-dimensional stripe pattern appearance.

CITATION LIST

Patent Literature

PTL 1: JP 58 (1983)-7494 B

SUMMARY OF INVENTION

Technical Problem

In Patent Literature 1, as is apparent from the fact that the term "colored layer" is used therein, the colored layer 300 represents the color of the pattern of the decorative member 100. However, in such a case where the colored layer 300 represents the color of the pattern of the decorative member 100, the ridges formed by providing the colored layer 300 along the two slopes 210, 220 do not look raised well, and the three-dimensional visual effect is not so high.

In view of the foregoing, the technique disclosed herein is intended to provide a decorative member with a high three-dimensional visual effect.

Solution to Problem

The above-mentioned problems is solved by a decorative member including: a colored light-transmissive resin layer having a front surface and a back surface, the back surface including a receding surface formed therein, the receding surface receding gradually toward the front surface to change a thickness that is a distance between the front surface and the back surface; a reflective layer formed on the back surface of the resin layer so as to cover the receding surface; and a pigmented layer interposed between the back surface of the resin layer and the reflective layer, the pigmented layer being configured so that lightness/depth of color thereof changes in accordance with the change in the thickness of the resin layer.

Advantageous Effects of Invention

In the above-mentioned decorative member, by changing, with the receding surface, the thickness of the colored resin layer, it is possible to form, on a convex portion formed by providing the reflective layer along the receding surface, a gradation of color that is pale at a thin portion of the resin layer and deep at a thick portion of the resin layer. Moreover, because of the transmission loss of light in the resin layer and the reflection of light by the reflective layer, the convex portion of the reflective layer along the receding surface looks bright at the thin portion of the resin layer and dark at the thick portion of the resin layer. With such a gradation having not only the lightness/depth of color but also the contrast of light utilizing the reflection of light, the convex portion of the reflective layer has a distinctly raised appearance. Thereby, a high three-dimensional visual effect can be obtained.

Furthermore, in the above-mentioned decorative member, the pigmented layer interposed between the resin layer and the reflective layer makes it possible to reduce the thickness of the resin layer while maintaining the high three-dimensional visual effect.

DESCRIPTION OF EMBODIMENTS

Hereinafter, embodiments of the present invention will be described with reference to the drawings.

Embodiment 1

Figure 1:
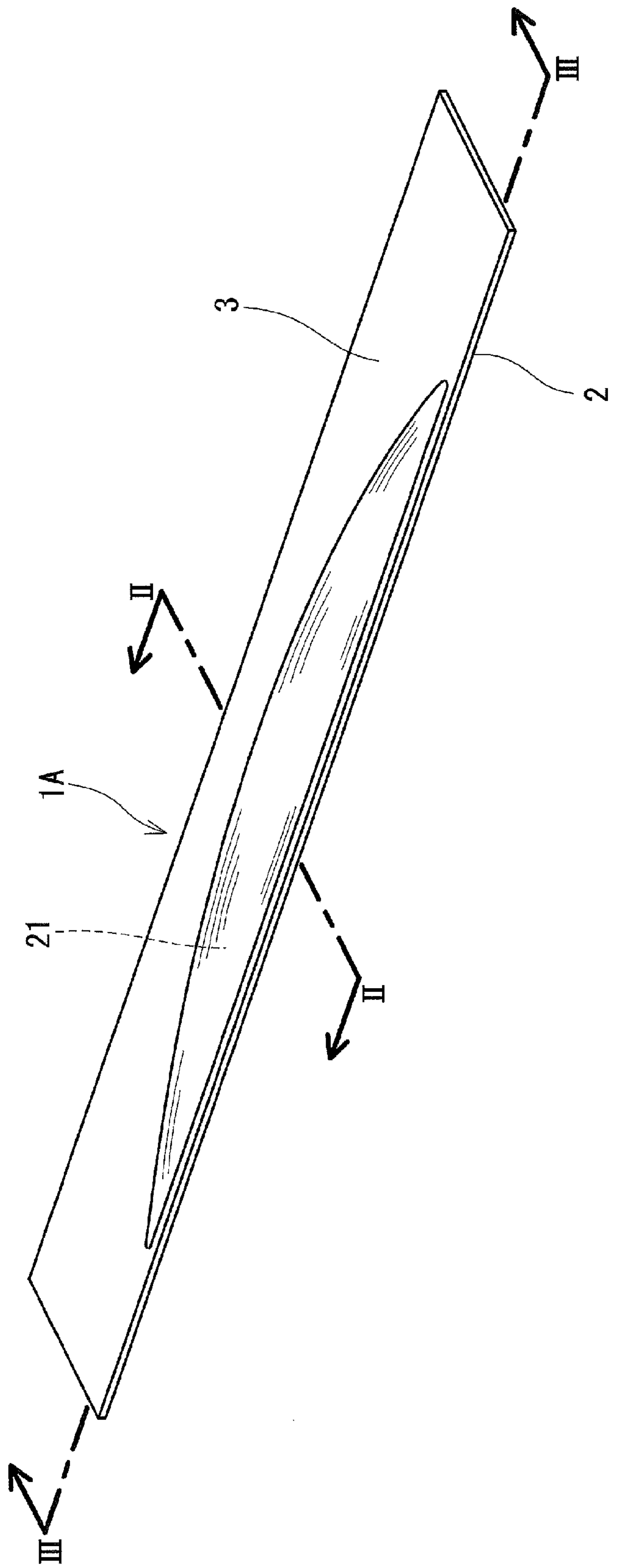
FIG. 1 is a perspective view of a decorative member according to Embodiment 1 of the present invention when viewed from a back side thereof.
Figure 2:
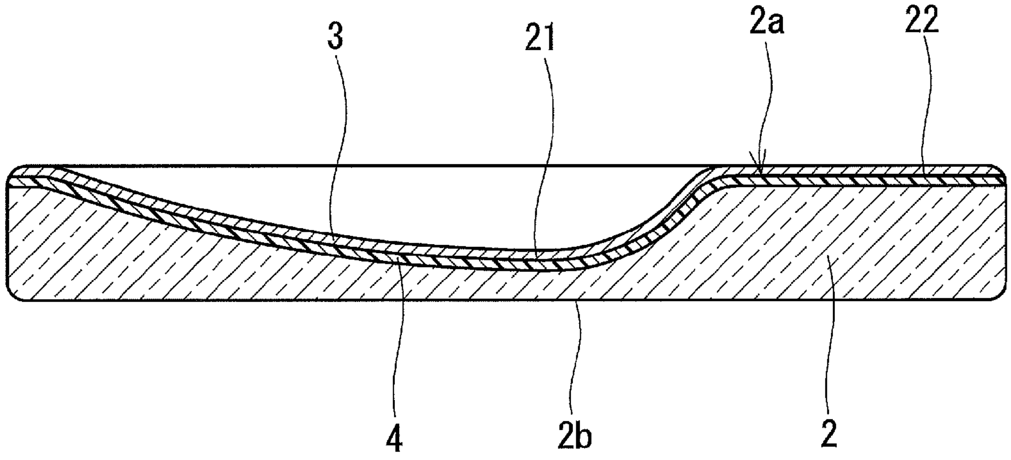
FIG. 2 is a cross-sectional view of FIG. 1 taken along the line II-II.
Figure 3:
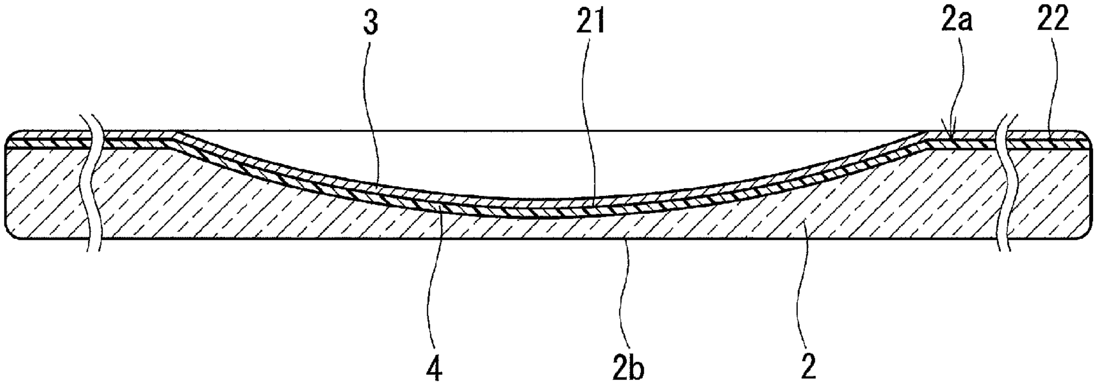
FIG. 3 is a cross-sectional view of FIG. 1 taken along the line III-III.

FIGS. 1 to 3 show a decorative member 1A according to Embodiment 1 of the present invention. The decorative member 1A has an approximately rectangular plate-like shape extending in a specified direction. The decorative member 1A has a resin layer 2 on a front side (on a bottom side in FIGS. 1 to 3), and a reflective layer 3 on a back side (on a top side in FIGS. 1 to 3).

The resin layer 2 is colored and light-transmissive. More specifically, the resin layer 2 allows light in a specified wavelength range of a visible light range to transmit therethrough, and absorbs or reflects light other than this. The color of the resin layer 2 is not particularly limited. Preferably, a relatively deep color (for example: black, red, and blue; or ACRYLITE produced by Mitsubishi Rayon Co., Ltd., color tone No. 530 (blue smoke), No. 540 (green smoke), No. 550 (brown smoke), and No. 83 (gray smoke)) is used. As the material composing the resin layer 2, various polymers, such as an acrylic resin, polycarbonate, ABS (acrylonitrile butadiene styrene), polyamide, and nylon, can be used independently or in combination as a polymer alloy.

The resin layer 2 has a front surface 2*b* that is one surface in a thickness direction thereof, and a back surface 2*a* that is the other surface in the thickness direction. The front surface 2*b* is a flat surface perpendicular to the thickness direction of the resin layer 2. In the back surface 2*a*, a receding surface 21 is formed. The receding surface 21 recedes gradually toward the front surface 2*b* to change a thickness that is a distance between the front surface 2*b* and the back surface 2*a*. In the present embodiment, the back surface 2*a* includes, outside the receding surface 21, a reference surface 22 that is parallel to the front surface 2*b* (in other words, the reference surface 22 is a flat surface perpendicular to the thickness direction of the resin layer 2.)

The receding surface 21 is curved continuously along at least one direction perpendicular to the thickness direction of the resin layer 2 so as to be convex toward the front surface 2*b*. As stated herein, the phrase "to be curved continuously" means that the gradient of a tangent of a cross-sectional shape of the receding surface 21 in a direction in which the receding surface 21 is curved varies in one-way direction from one end to the other end of the cross-sectional shape substantially continuously. It should be noted that the receding surface 21 may be formed in a linear curving manner with a constant curvature, or in a non-linear curving manner with a variable curvature. The term "substantially" indicates a concept including a case where: concave and convex portions such as those remaining on the surface during processing are ignored; and the gradient of a tangent of a cross-sectional shape of the receding surface 21 varies in one-way direction from one end to the other end of the cross-sectional shape continuously in a shape recognizable by human vision.

In the present embodiment, the receding surface 21 is a concave surface forming a depression that opens while broadening. In other words, the cross-sectional shape of the receding surface 21 in the direction in which the receding surface 21 is curved extends from one end to the other end so as to come closer to the front surface 2*b* and then go away therefrom. Furthermore, the concave surface of the present embodiment has a dome shape curved continuously along a longer direction and a shorter direction of the decorative member 1A (two directions perpendicular to each other and to the thickness direction of the resin layer 2.) The reference surface 22 surrounds the receding surface 21.

The shape of the receding surface 21 in a plan view is not particularly limited. Preferably, the receding surface 21 extends in the longer direction of the decorative member 1A. For example, the shape of the receding surface 21 may be an elliptical shape or a strip-like shape with both ends being roundish, when viewed from the thickness direction of the resin layer 2.

A peripheral portion of the receding surface 21 may be joined directly to the reference surface 22 angularly so as to form a ridgeline with the reference surface 22. Alternatively, there may be provided a joint, having a cross-sectional shape that is convex in the direction opposite to that of the receding surface 21, annularly between the peripheral portion of the receding surface 21 and the reference surface 22, and the peripheral portion of the receding surface 21 may be joined smoothly to the reference surface 22 via the joint.

The resin layer 2 as mentioned above can be molded by a molding method such as injection molding, heating compression molding, and a combination of extrusion molding and heating compression molding. In molding the resin layer 2, it is preferable to use a mirror-finished metal mold in order to prevent the irregular reflection of light by the front surface 2*b* and to enhance the texture.

The reflective layer 3 is formed on the back surface 2*a* of the resin layer 2 so as to cover the receding surface 21 and the reference surface 22. The reflective layer 3 serves to reflect the light that has transmitted through the resin layer 2. Preferably, the reflective layer 3 essentially blocks light in the visible light range (approximately 400 to 750 nm) from transmitting therethrough, and has high reflectance to light essentially throughout the visible light range. From the viewpoint of regularly reflecting the light that has transmitted through the resin layer 2, a front surface of the reflective layer 3 contacting the receding surface 21 and the reference surface 22 of the resin layer 2 preferably is a lustrous smooth surface. For example, the transmittance of the reflective layer 3 to visible light preferably is 5% or less, more preferably 1% or less, and particularly preferably 0.1% or less. The reflectance and the smooth surface are expressed in terms of a gloss (luster) value of the front surface of the reflective layer 3. When the gloss value in the case where the brightness difference between incident light and receiving light is 10%, with the incident angle being 60 degree and the receiving angle being −60 degree on a glass surface (with a refractive index of 1.567), is taken as 100, the gloss value of the front surface of the reflective layer 3 preferably is 200 or more, more preferably 700 or more, and particularly preferably about 800.

Furthermore, the reflective layer 3 preferably has a metallic color. The reflective layer 3 can be composed of, for example: a coating film formed by coating a coating material containing a metallic pigment or a metallic colorant, or by printing a metallic ink; a metal film formed by vapor-depositing metal such as aluminum; or a metallic-colored sheet bonded to the back surface 2*a* of the resin layer 2.

In the present embodiment, a pigmented layer 4 further is provided between the back surface 2*a* of the resin layer 2 and the reflective layer 3. The pigmented layer is configured so that lightness/depth of color thereof changes in accordance with the change in the thickness of the resin layer. The pigmented layer 4 as a whole allows light in a visible light range to transmit therethrough. In the pigmented layer 4, the amount of light in a visible light that transmits a deep-colored portion is smaller than that transmitting a pale-colored portion.

Specifically, on the receding surface 21, the pigmented layer 4 is composed of dots whose density increases as the thickness of the resin layer 2 increases. Such dots can be formed by a printing technique using an ink. As the printing technique, gravure printing or screen printing is used suitably. On the reference surface 22, the pigmented layer 4 may be composed of dots with a density comparable to that of the dots on the peripheral portion of the receding surface 21, or may be composed of a coating film formed by printing the ink on the entire reference surface 22.

Figure 4:
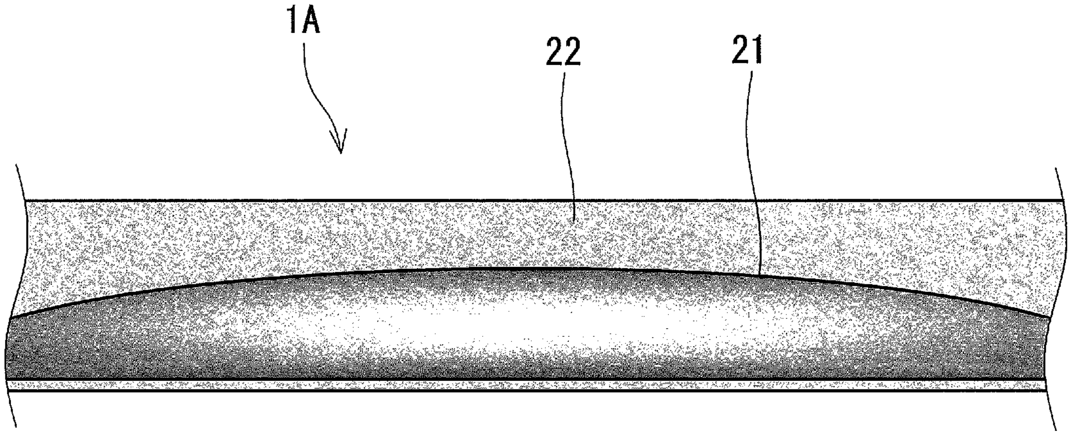
FIG. 4 is a view showing an appearance of the decorative member shown in FIG. 1 when viewed from a front side thereof.

In the decorative member 1A of the present embodiment described above, by changing, with the receding surface 21, the thickness of the colored resin layer 2, it is possible to form, on the convex portion formed by providing the reflective layer 3 along the receding surface 21, a gradation of color that is pale at the thin portion of the resin layer 2 and deep at the thick portion of the resin layer 2 as shown in FIG. 4. Moreover, because of the transmission loss of light in the resin layer 2 and the reflection of light by the reflective layer 3, the convex portion of the reflective layer 3 along the receding surface 21 looks bright at the thin portion of the resin layer 2 and dark at the thick portion of the resin layer 2. With such a gradation having not only the lightness/depth of color but also the contrast of light utilizing the reflection of light, the convex portion of the reflective layer 3 has a distinctly raised appearance. Thereby, a high three-dimensional visual effect can be obtained.

Furthermore, in the decorative member 1A of the present embodiment, the pigmented layer 4 interposed between the resin layer 2 and the reflective layer 3 makes it possible to reduce the thickness of the resin layer 2 while maintaining the high three-dimensional visual effect. In the case where the pigmented layer 4 is not provided, the thickness of the resin layer 2 is the only factor for defining the lightness/depth of color in the gradation. Therefore, in order to obtain a high three-dimensional visual effect, it is necessary to increase the thickness of the resin layer 2 to some extent and increase the level difference between the top and the bottom of the receding surface 21 (the distance over which the receding surface 21 recedes in the thickness direction of the resin layer 2). However, in the case where the level difference in the receding surface 21 is increased in this way, warpage and weld occur when the resin layer 2 is molded by, for example, injection molding, which decreases the yield. In contrast, in the case where the pigmented layer 4 is provided between the resin layer 2 and the reflective layer 3 as in the present embodiment, the lightness/depth of color in the gradation can be defined also by the lightness/depth of color of the pigmented layer 4. This makes it possible to obtain a comparable three-dimensional visual effect even when the level difference in the receding surface 21 is reduced and the thickness of the resin layer 2 is reduced. As a result, it is possible to suppress a decrease in the yield at the time of molding the resin layer 2 and to reduce the manufacturing cost.

In addition, in the decorative member 1A of the present embodiment, since the receding surface 21 is curved continuously, it is possible to change gradually and minutely the lightness/depth of color and the contrast of light in the gradation from the thin portion of the resin layer to the thick portion of the resin layer. Moreover, the degree of the gradation formed on the convex portion of the reflective layer 3 varies in accordance with the angle at which the decorative member 1A is viewed. Thereby, the three-dimensional visual effect can be accentuated further.

Furthermore, in the decorative member 1A of the present embodiment, the reference surface 22 is provided outside the receding surface 21. The normal direction of the front surface of the reflective layer 3 becomes lateral gradually from the bottom of the receding surface 21 toward the peripheral portion, and accordingly the colored resin layer 2 looks darker gradually. At a portion right above the peripheral portion of the receding surface 21, the darkness reaches its peak and the resin layer 2 looks blackish. In contrast, at the thickest portion at which the thickness of the resin layer 2 defined by the reference surface 22 is largest, the reflective layer 3 is parallel to the front surface 2*b*. For this reason, at the thickest portion, the colored resin layer 2 looks deeper in color than at the thinnest portion at which the thickness of the resin layer 2 defined by the bottom of the receding surface 21 is smallest, and paler than at the portion right above the peripheral portion of the receding surface 21. Thereby, the darkness at the peripheral portion of the receding surface 21 is accentuated in comparison with the reference surface 22, and a higher three-dimensional visual effect can be obtained.

Embodiment 2

Figure 5A:
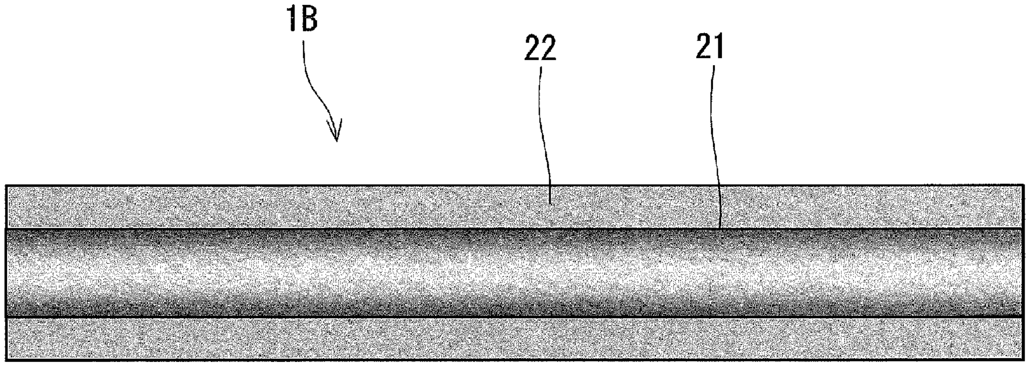
FIG. 5A is a view showing an appearance of a decorative member according to Embodiment 2 of the present invention when viewed from a front side thereof.
Figure 5B:
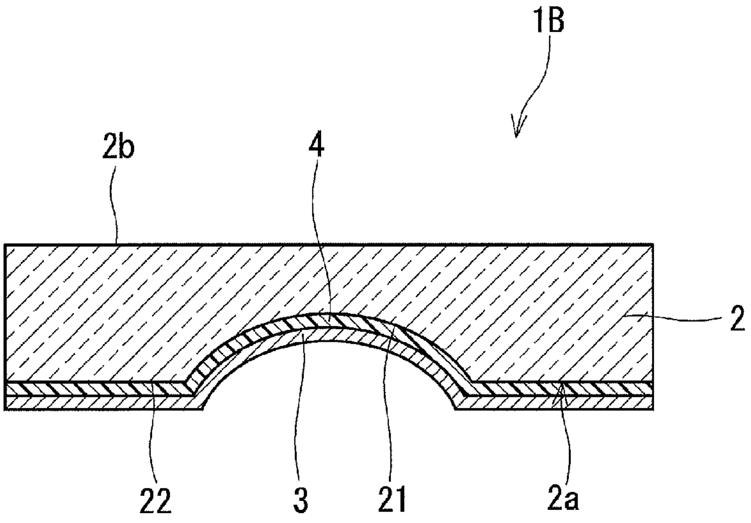
FIG. 5B is a cross-sectional view of the decorative member.

Next, FIGS. 5A and 5B show a decorative member 1B according to Embodiment 2 of the present invention. In the present embodiment, the same components as those in Embodiment 1 are indicated with the same reference numerals, and the descriptions thereof are omitted.

In the decorative member 1B of the present embodiment, a concave surface forming a groove-like depression extending in a longer direction of the decorative member 1B is formed, as the receding surface 21, in the back surface 2*a* of the resin layer 2. That is, the concave surface has a cylindrical shape curved continuously along only a shorter direction (one direction perpendicular to the thickness direction of the resin layer 2) of the decorative member 1B. Thereby, a gradational pattern, as shown in FIG. 5A, having a three-dimensional visual effect is expressed in the decorative member 1B.

Also in the gradation shown in FIG. 5A, the lightness/depth of color and the contrast of light in the gradation change gradually and minutely from the thin portion of the resin layer to the thick portion of the resin layer, as in Embodiment 1. Furthermore, outside the receding surface 21, the colored resin layer 2 looks to have an intermediate color and brightness of the gradation. Therefore, the same effects also can be obtained in Embodiment 2 as in Embodiment 1.

Modification

Although the front surface 2*b* of the resin layer 2 is a flat surface in Embodiments 1 and 2, the front surface 2*b* of the resin layer 2 may be bowed or may be formed with an undulation, for example. Moreover, the reference surface 22 of the back surface 2*a* of the resin layer 2 does not necessarily have to be a flat surface perpendicular to the thickness direction of the resin layer 2. For example, in the case where the front surface 2*b* is bowed, the reference surface 22 may be a bowed surface parallel to the front surface 2*b*.

Figure 6A:
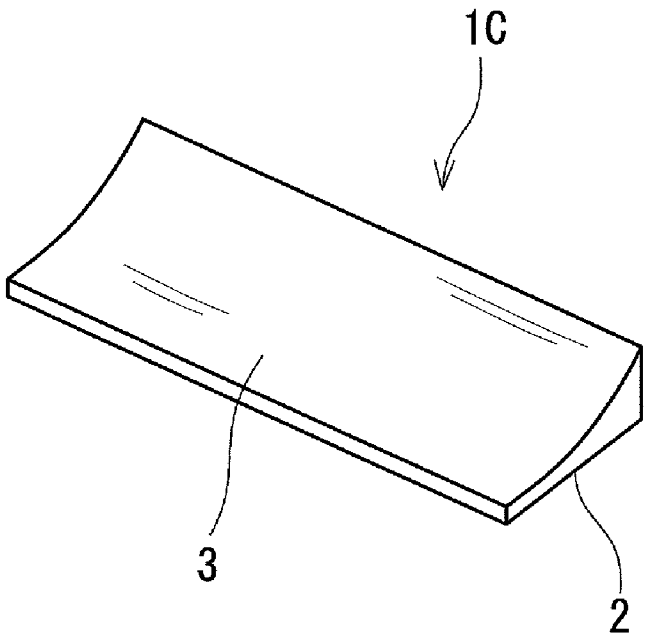
FIG. 6A is a perspective view of a modified decorative member when viewed from a back side thereof.
Figure 6B:
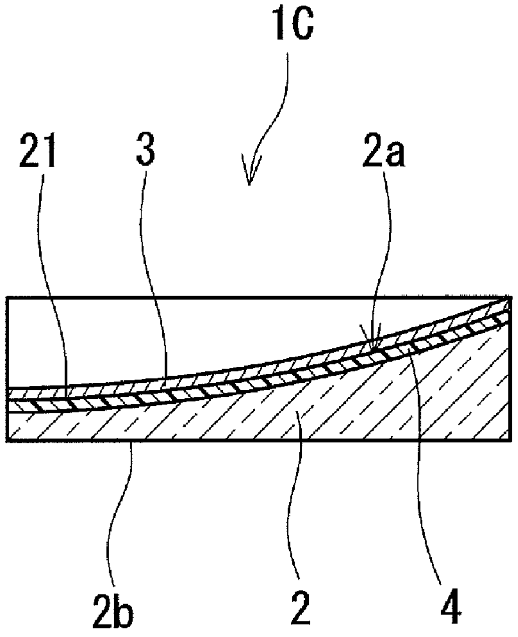
FIG. 6B is a cross-sectional view of the decorative member.

Alternatively, like a modified decorative member 1C shown in FIGS. 6A and 6B, the receding surface 21 may be formed over the entire back surface 2*a* of the resin layer 2. However, with the reference surface 22 being provided outside the receding surface 21 as in Embodiments 1 and 2, the darkness at an edge of the receding surface 21 is accentuated in comparison with the reference surface 22 and a higher three-dimensional visual effect can be obtained.

Furthermore, the receding surface 21 does not necessarily have to be a concave surface forming a depression that opens while broadening. As shown in FIG. 6B, the receding surface 21 may have a cross-sectional shape that extends from one end to the other end so as to only come closer to the front surface 2*b*, in the direction in which the receding surface 21 is curved.

Figure 7:
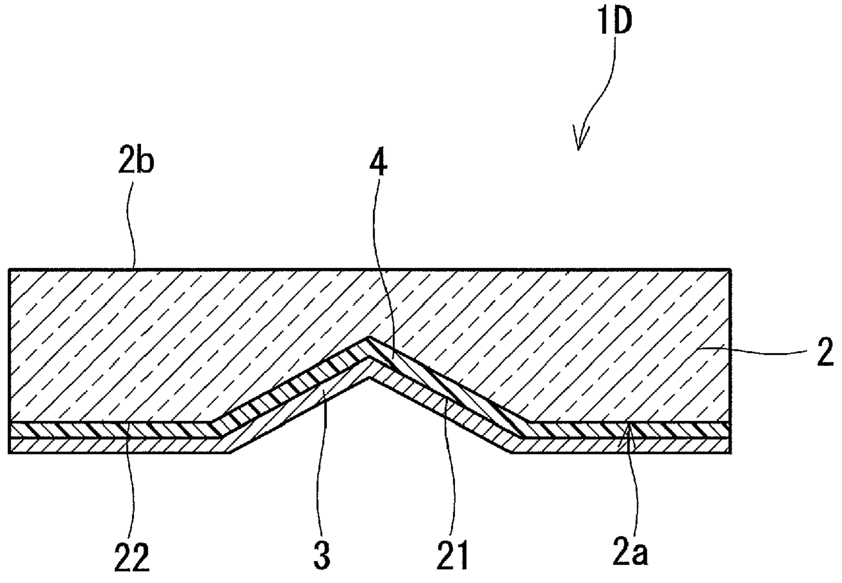
FIG. 7 is a cross-sectional view of another modified decorative member.
Figure 8:
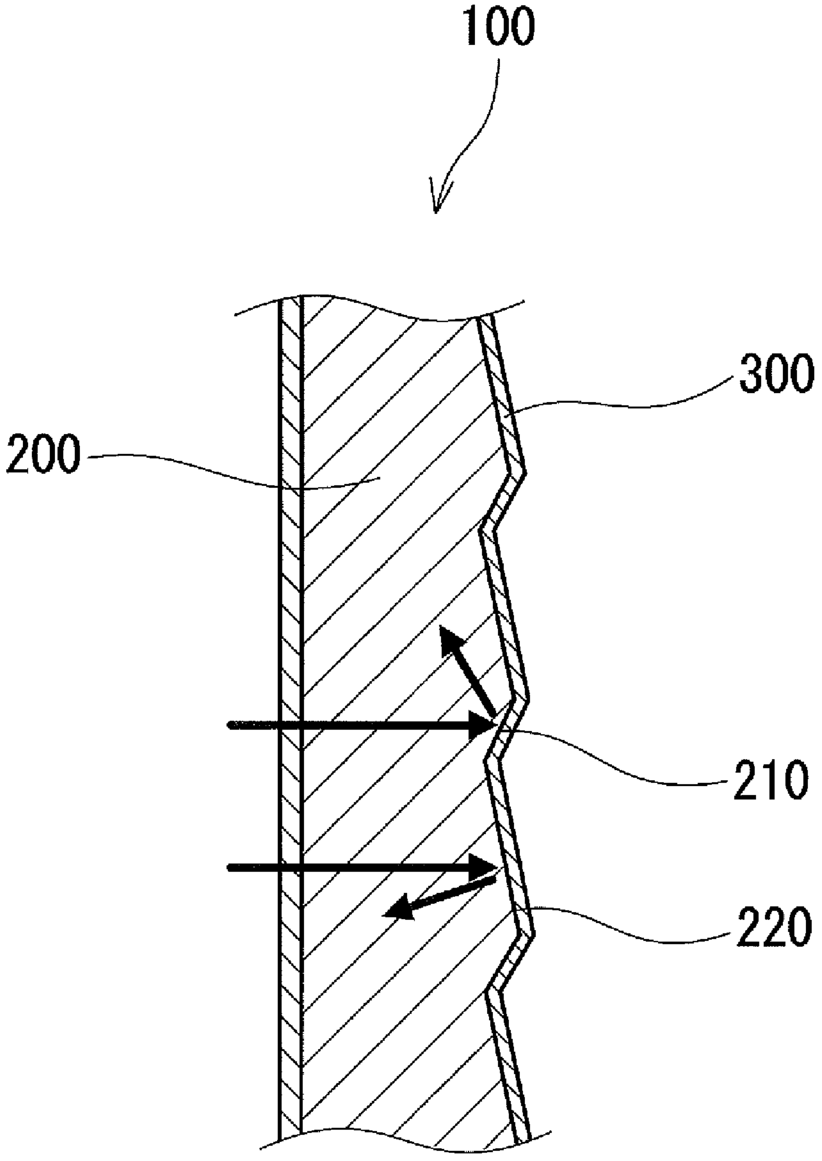
FIG. 8 is a cross-sectional view of a conventional decorative member.

Moreover, the receding surface 21 does not necessarily have to be curved along at least one direction perpendicular to the thickness direction of the resin layer 2 so as to be convex toward the front surface 2*b*. For example, like a modified decorative member 1D shown in FIG. 7, the receding surface 21 may be inclined linearly toward the front surface 2*b*. However, with the cross-sectional shape of the receding surface 21 being a curved line as in Embodiments 1 and 2, the degree of the gradation formed on the convex portion of the reflective layer 3 varies in accordance with the angle at which the decorative member 1A is viewed, and thereby the three-dimensional visual effect can be accentuated further.

The decorative member according to the present invention does not necessarily have to have a shape extending in a specified direction. For example, it may have a regular polygonal shape in a plan view, or a rectangular frame shape that opens in the thickness direction of the resin layer 2.

EXAMPLES

Hereinafter, the present invention will be described in detail with reference to Examples, but the present invention is not restricted to these Examples.

Example

A resin layer with shaped as shown in FIGS. 5A and 5B was molded by injection molding using an acrylic resin (ACRYLITE produced by Mitsubishi Rayon Co., Ltd., color tone No. 530 blue smoke). From the viewpoint of mechanical strength and moldability, the thickness of the thinnest portion defined by the bottom of the receding surface 21 was set to 1.0 mm, and the thickness of the thickest portion defined by the reference surface 22 was set to 2.0 mm. In the back surface of this resin layer, dots with a diameter of 10 μm were formed on the receding surface by gravure printing using a black ink so that the density of the dots changes gradually from 0 dots/$mm^2$ to 19000 dots/$mm^2$ from the bottom of the receding surface to the peripheral portion of the receding surface, and the ink was printed on the entire reference surface. Thus, a pigmented layer was formed. Thereafter, a coating material containing a metallic pigment (SUPER BRIGHT SILVER 2000, produced by Dai Nippon Toryo Co., Ltd.) was applied on the pigmented layer to form a coating film serving as the reflective layer. Thereby, a decorative member was obtained.

Comparative Example 1

A decorative member was obtained in the same manner as in Example, except that the thickness of the thickest portion of the resin layer was set to 3.0 mm and no pigmented layer was formed.

Comparative Example 2

A decorative member was obtained in the same manner as in the Example, except that no pigmented layer was formed.

(Bright/Dark Ratio)

The decorative members of Example and Comparative Examples were measured for bright/dark ratio. The measurement of the bright/dark ratio was made by measuring the reflectances of the thinnest portion and the thickest portion in increments of 10 nm in the wavelength range of 400 nm to 740 nm with a spectrophotometer (CM-3600d, manufactured by Konica Minolta Holdings, Inc.), and calculating the ratio between the averages thereof. Table 1 shows the results.

TABLE 1

| | Thickness of the thinnest portion (mm) | Thickness of the thickest portion (mm) | Pigmented layer | Bright/dark ratio |
|---|---|---|---|---|
| Example | 1.0 | 2.0 | Provided | 10.3 |
| Comparative Example 1 | 1.0 | 3.0 | Not provided | 10.5 |
| Comparative Example 2 | 1.0 | 2.0 | Not provided | 2.4 |

In Comparative Example 1, the level difference in the receding surface formed in the back surface of the resin layer is large and a high three-dimensional visual effect can be obtained. However, the large level difference in the receding surface causes warpage and weld to occur, decreasing the yield at the time of molding the resin layer. In Comparative Example 2, the yield at the time of molding the resin layer is less decreased because the level difference in the receding surface is small, but the bright/dark ratio is lowered significantly in comparison with Comparative Example 1, deteriorating the three-dimensional visual effect significantly.

In contrast, in Example, even with the small level difference in the receding surface, it is possible to keep the bright/dark ratio comparable to that of Comparative Example 1 and to obtain a high three-dimensional visual effect.

INDUSTRIAL APPLICABILITY

The present invention is useful for decorative members to be used for providing high quality decoration to casings of electrical devices, etc.

The invention claimed is:

1. A decorative member comprising:

a colored light-transmissive resin layer having a front surface and a back surface, the back surface including a receding surface formed therein, the receding surface receding gradually toward the front surface to change a thickness that is a distance between the front surface and the back surface;

a reflective layer formed on the back surface of the resin layer so as to cover the receding surface; and a pigmented layer interposed between the back surface of the resin layer and the reflective layer, the pigmented layer being configured so that lightness/depth of color thereof changes in accordance with the change in the thickness of the resin layer, wherein, on the receding surface, the pigmented layer is composed of dots whose density increases as the thickness of the resin layer increases.

2. The decorative member according to claim 1, wherein the receding surface is curved continuously along at least one direction perpendicular to a thickness direction of the resin layer so as to be convex to the front surface.

3. The decorative member according to claim 1, wherein the back surface of the resin layer includes a reference surface outside the receding surface, and the reference surface also is covered with the reflective layer.

4. The decorative member according to claim 1, wherein the front surface of the resin layer is a flat surface perpendicular to a thickness direction of the resin layer.

5. The decorative member according to claim 1, wherein the reflective layer has a metallic color.

6. The decorative member according to claim 5, wherein the reflective layer is composed of a coating film formed by coating or printing, a metal film formed by vapor deposition, or a sheet bonded to the back surface of the resin layer.

7. A decorative member comprising:

a colored light-transmissive resin layer having a front surface and a back surface, the back surface including a receding surface formed therein, the receding surface receding gradually toward the front surface to change a thickness that is a distance between the front surface and the back surface;

a reflective layer formed on the back surface of the resin layer so as to cover the receding surface; and a pigmented layer interposed between the back surface of the resin layer and the reflective layer, the pigmented layer being configured so that lightness/depth of color thereof changes in accordance with the change in the thickness of the resin layer, wherein the reflective layer has a metallic color.

* * * * *